(12) United States Patent
Mahadevan et al.

(10) Patent No.: US 11,500,662 B2
(45) Date of Patent: Nov. 15, 2022

(54) METHOD FOR DYNAMIC OPTIMIZATION OF WEB APPLICATIONS

(71) Applicant: ARRIS Enterprises LLC, Suwanee, GA (US)

(72) Inventors: Venkatesh Prabu Mahadevan, Karnataka (IN); Lakshmi Arunkumar, Karnataka (IN); Kirtikumar Rotaliwala, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 26 days.

(21) Appl. No.: 17/141,546

(22) Filed: Jan. 5, 2021

(65) Prior Publication Data

US 2021/0208913 A1 Jul. 8, 2021

Related U.S. Application Data

(60) Provisional application No. 62/957,856, filed on Jan. 7, 2020.

(51) Int. Cl.
*G06F 9/44* (2018.01)
*G06F 9/455* (2018.01)
*H04L 67/01* (2022.01)

(52) U.S. Cl.
CPC .......... *G06F 9/45525* (2013.01); *H04L 67/01* (2022.05)

(58) Field of Classification Search
CPC ...... G06F 9/45525; H04L 67/42; H04L 67/01
USPC ................. 717/136–137, 141–143
See application file for complete search history.

(56) References Cited

U.S. PATENT DOCUMENTS

| | | | | |
|---|---|---|---|---|
| 8,266,224 | B2* | 9/2012 | Ramarao | G06Q 10/10 717/136 |
| 9,305,055 | B2* | 4/2016 | Knott | H04L 63/1425 |
| 9,307,442 | B2* | 4/2016 | Bachmann | H04L 69/04 |
| 10,812,361 | B2* | 10/2020 | Hughes | H04L 43/08 |
| 10,819,861 | B2* | 10/2020 | Leemet | H04M 15/43 |

FOREIGN PATENT DOCUMENTS

EP 2 363 995 9/2011

OTHER PUBLICATIONS

Eilers , "IseHarvest: TCP packet data re-assembler framework for network traffic content", 2008, Master Thesis, Iowa State University, 48 pages (Year: 2008).*
Office Action dated Jan. 13, 2022 in Canadian Patent Application No. 3,104,938.

* cited by examiner

*Primary Examiner* — Ted T. Vo
(74) *Attorney, Agent, or Firm* — Wenderoth, Lind & Ponack, L.L.P.

(57) ABSTRACT

Provided is a method for optimization of data by a networking device. The method including receiving, from a server, a data packet including data for use with an application executable in a web browser at an external device, extracting data from the data packet, identifying a type of the extracted data, performing optimization of the extracted data based on the identified type of the extracted data and generating optimized data based on the optimization, reconstructing the data packet to include the optimized data, and transmitting, to the external device, the reconstructed data packet.

20 Claims, 8 Drawing Sheets

METHOD FOR DYNAMIC OPTIMIZATION OF WEB APPLICATIONS

BACKGROUND

1. Technical Field

The subject matter of the present disclosure relates generally to dynamic optimization of web applications.

2. Description of the Related Art

A web application is a program that is stored on a server and accessed using a client, for example, a client-side web browser. Typically, a web application will form a part of a website that is designed to interact with a user. A web application may be configured using client-side scripting consisting of code that is entirely executed by the client-side browser, server-side scripting consisting of code that is entirely executed by the server, or, most typically, a combination there of.

Client-side scripting allows the website to provide programmable interaction with the user without having to communicate with the server in response to the interaction. However, client-side scripting may communicate with the server in order to send requests to the server and/or retrieve data from the server, as necessary, in response to the interaction with the user. When a client-side web browser sends a request for a website containing a web application programmed using client-side scripting, the client-side scripting is typically transmitted, by a server in response to receiving the request, in data packets along with other data necessary to display the website in the client-side web browser. Example languages used for client-side scripting include JavaScript, Hypertext Markup Language (HTML), and Cascading Style Sheets (CSS).

Server-side scripting allows delivery of dynamic content to a website displayed on a client-side browser in response to end user interaction with the website. Server-side scripting is typically used in combination with client-side scripting in order to provide a web application that interacts with the user. For example, client-side scripting running on a client-side web browser may receive an input from an end user and transmit the user input to a server; server-side scripting running on the server may process the user input and transmit a response to the client-side web browser; and the client-side scripting may process the response and generate an appropriate interaction with the user. Example languages used for server-side scripting include Hypertext Preprocessor (PHP), Python, Ruby, ColdFusion, C#, Java, and C++.

In addition to being configured using a combination of client-side scripting and server-side scripting, web applications typically make use of resource files, such as video files, image files, text files, fonts, and/or other embeddable content for interacting with a user. Additionally resource files, such as Extensible Markup Language (XML) files and (JavaScript Object Notation) JSON files, are used enabling efficient data exchange between client-side scripting running on a client-side web browser and server-side scripting running on a server.

Further, client-side scripting executed by a client-side web browser may be used to collect data on how a user is interacting with a website for data analytics purposes. This data is useful for assessing and improving the effectiveness of the website in addition to measuring traffic to the website and demographics of users of the website.

However, web applications have become more complex in terms of the size of client-side scripts and resource files for rending the web applications on a client-side web browser, and there has been an increase in the volume of data to be collected for data analytics purposes. This added complexity has led to longer processing times for tasks performed by the web applications, longer response time for transferring and receiving data from a server, and increased usage of bandwidth for transfer of data. This had led to longer waiting times for a user when interacting with a website using web applications, thereby negatively affecting the user experience. Accordingly, a technique for dynamic optimization of data related to a web application is desired in order to reduce waiting times for a user when interacting with a website using the web application.

BRIEF SUMMARY

According to an aspect of the present disclosure, a method is provided for optimization of data by a networking device. The method including receiving, from a server, a data packet including data for use with an application executable in a web browser at an external device, extracting data from the data packet, identifying a type of the extracted data, performing optimization of the extracted data based on the identified type of the extracted data and generating optimized data based on the optimization, reconstructing the data packet to include the optimized data, and transmitting, to the external device, the reconstructed data packet.

According to another aspect of the present disclosure, a method is provided for optimization of data by a server. The method including receiving, from a networking device, a data packet including data related to an application executable in the web browser at the external device, performing an action to obtain data based on the data related to an application executable in the web browser at the external device, identifying a type of the obtained data, performing optimization of the obtained data based on the identified type of the obtained data and generating optimized data based on the optimization, constructing a data packet to include the optimized data, and transmitting, to the networking device, the constructed data packet.

According to another aspect of the present disclosure, a method is provided for optimization of data by a networking device. The method including receiving, from an electronic device, a data packet including data for use with an application executable in a web browser at the external device, extracting data from the data packet, identifying a type of the extracted data, performing optimization of the extracted data based on the identified type of the extracted data and generating optimized data based on the optimization, reconstructing the data packet to include the optimized data, and transmitting, to a server, the reconstructed data packet.

As will be described below by way of example, the present disclosure provides an technique for dynamic optimization of data related to a web application, thereby allowing for exchanging of optimized data to reduce processing times for tasks performed by the web applications, decrease response time for transferring and receiving data from a server, and decrease usage of bandwidth for transfer of data. Accordingly, the present disclosure provides an improved user experience when interacting with a website using a web application optimized according to the present disclosure.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
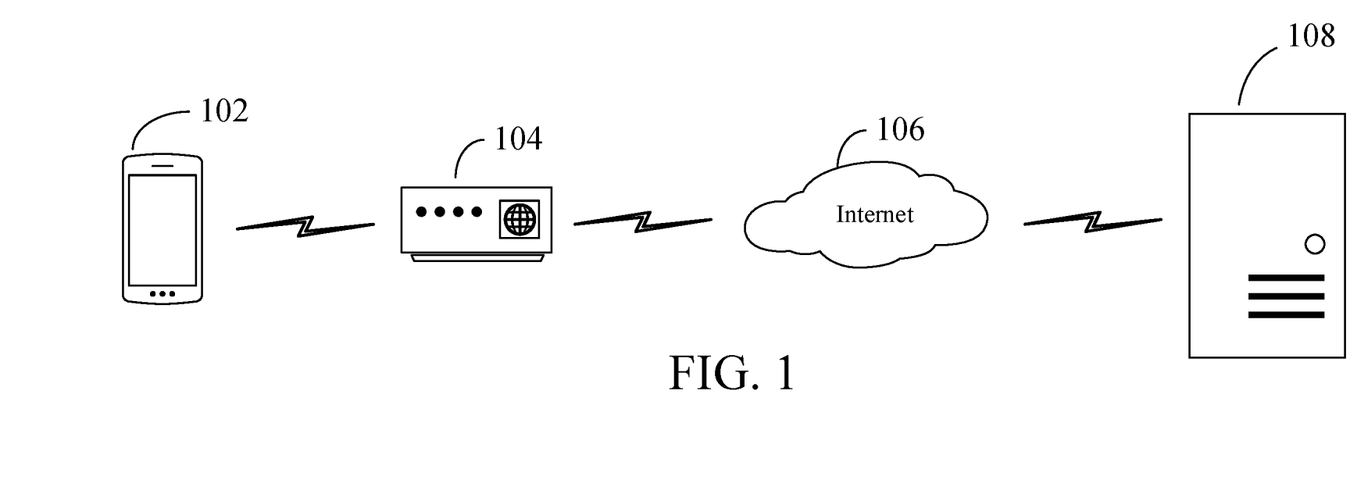
FIG. 1 illustrates an exemplary diagram of a system in which a method for dynamic optimization of web applications is implemented according to an aspect of the present disclosure.

FIG. 1 illustrates an exemplary diagram of a system in which a method for dynamic optimization of web applications is implemented according to an aspect of the present disclosure.

As illustrated in FIG. 1, the system includes an electronic device 102, a networking device 104, and a server 108, where the network device 104 facilitates communication between the electronic device 102 and the server 108 via the internet 106.

The electronic device 102 may be any system or device capable of running a client-side browser for browsing the internet 106. Non-limiting examples of the electronic device 102 include a mobile device, a personal computer, a laptop, a smartphone, a tablet computer, a personal digital assistant, in-vehicle computing systems, and other similar computing devices. The present disclosure contemplates that more than one electronic device 102 may be a part of the system as illustrated in FIG. 1.

The networking device 104 facilities communication between electronic device 102 and server 108 via internet 106. More specifically, the networking device 102 may be any system or device capable of receiving a request from the electronic device 102, performing processing on the request in accordance with the aspects of the present disclosure described herein, and forwarding the request to the server 108 via the internet 106. Additionally, the networking device 102 may be any system or device capable of receiving a response from the server 108 via the internet 106, performing processing on the response in accordance with the aspects of the present disclosure described herein, and forwarding the response to the electronic device 102. Non-limiting of the networking device 104 include a modem, a router, a repeater, a hub, a bridge, a switch, a gateway, and other similar computer devices.

The networking device 104 may communicate with the electronic device 102 via wired communication such as coaxial cable and fiber-optic link to allow communication via Ethernet, wireless communication such as IEEE 802.11 protocol, a Radio Frequency For Consumer Electronics (RF4CE) protocol, Bluetooth protocol, ZigBee protocol, Z-Wave protocol, or IEEE 802.15.4 protocol, cellular data service (3G/4G/5G), or a combination thereof.

Additionally, the present disclosure contemplates that the electronic device 102 and the networking device 104 may form a residential network operating as a local area network (LAN), wireless local area network (WLAN), or virtual local area network (VLAN).

The server 108 may be any system or device capable of storing resources of a website and performing an action in response to receiving a request for data associated with the website. More specifically, the server 108 may be any system or device capable of receiving a request forwarded by the networking device 104 via the internet 106 and performing an action based on the received request, such as generating a response based on the received request and transmitting the request to the networking device 104 via the internet 106. Non-limiting examples of the server include a web server, an application server, a database server, and other similar computing devices. Additionally, the present disclosure contemplates that server 106 may be a cloud server running in a cloud computing environment.

The networking device 104 and the server 106 communicate via the internet 106 using wired communication such as coaxial cable and fiber-optic link to allow communication via Ethernet, wireless communication such as IEEE 802.11 protocol, a Radio Frequency For Consumer Electronics (RF4CE) protocol, Bluetooth protocol, ZigBee protocol, Z-Wave protocol, or IEEE 802.15.4 protocol, cellular data service (3G/4G/5G), or a combination thereof.

Figure 2:
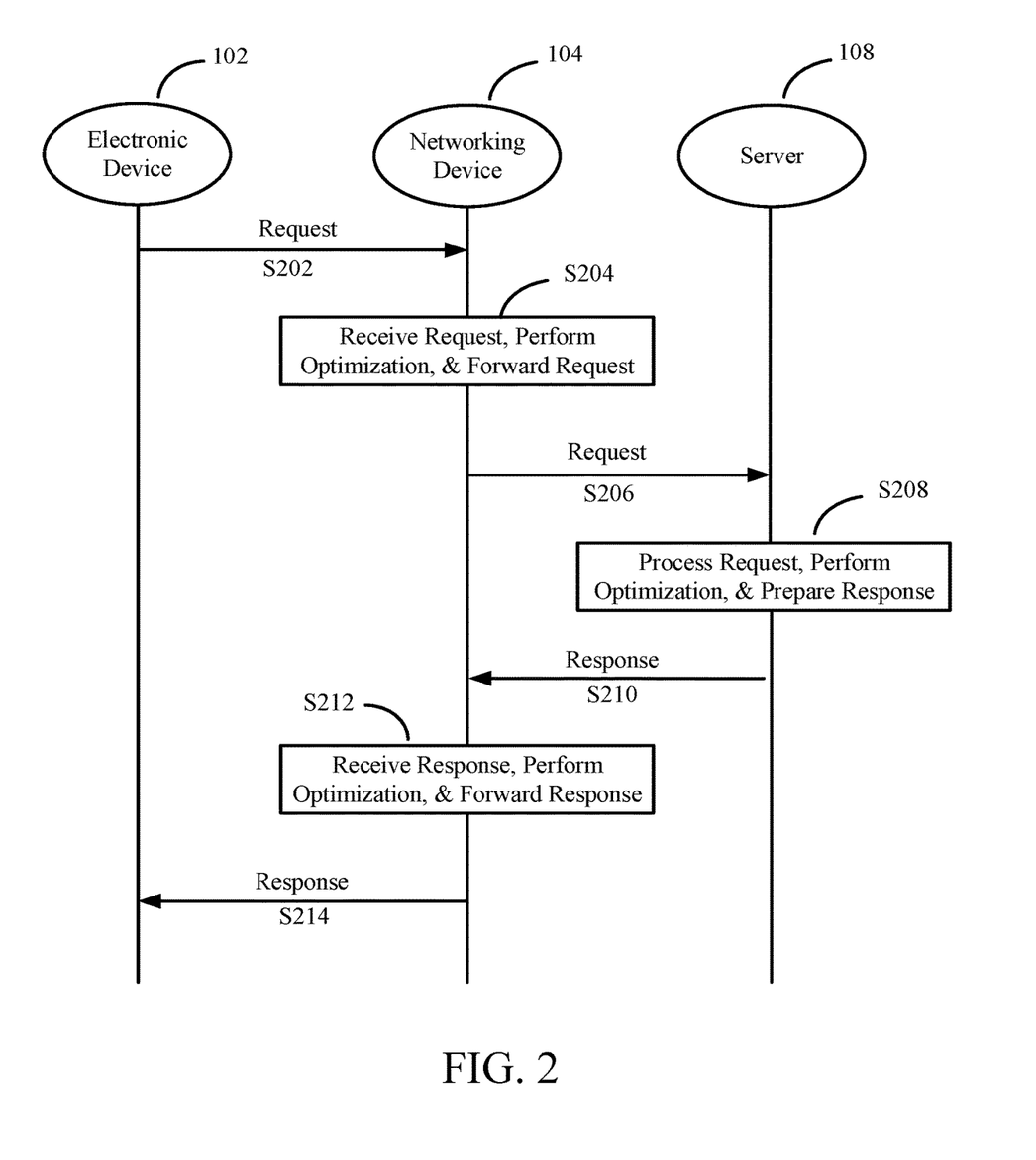
FIG. 2 illustrates a process flow of the system of dynamic optimization of web applications of FIG. 1.

FIG. 2 illustrates an exemplary process flow of the system of dynamic optimization of web applications of FIG. 1. More specifically, FIG. 2 illustrate an exemplary process flow between the electronic device 102, the networking device 104, and the server 108 of FIG. 1.

At Step S202, electronic device 102 sends a request to networking device 104. The request may one or more data packets having a data structure for exchanging data between the electronic device 102 and the server 108. For example, the one or more data packets of the request may be configured using Transmission Control Protocol/Internet Protocol (TCP/IP).

For example, the request may be a Hypertext Transfer Protocol (HTTP) request generated by a client-side web browser of the electronic device 102 for requesting a resource hosted by the server 108, such as, a website hosted on the server 108 or a resource associated with a website currently displayed using the client-side web browser of the electronic device 102.

Alternatively, the request may be an HTTP request generated by client-side scripting of a web application executed in the client-side web browser. The HTTP request generated by the client-side scripting may include analytics data from the web application sent to the server 108 for storage, and/or data for processing by the server 108, such as by server-side scripting of the web application executed on the server 108.

At Step S204, the networking device 104 receives the request from the electronic device 102, and the networking device 104 performs optimization of data included in the request as described below in detail with reference to FIG. 3. After performing the optimization, the networking device 104 forwards the request to server 108 via internet 106 at Step S206.

At Step S208, the server 108 receives the request forwarded by the networking device 104 via the internet 106, and the server 108 performs an action based on the received request, such as generating a response based on the received request and transmitting the request to the networking device 104 via the interview 106 at step S210. The response may be may one or more data packets having a data structure for exchanging data between the electronic device 102 and the server 108. For example, the one or more data packets of the response may be configured using TCP/IP.

For example, in a case when the request is an HTTP request for requesting a resource hosted by the server 108, the server 108 accesses a storage based on the received request to retrieve the requested resource and performs optimization of the resource as described below in detail with reference to FIG. 4. After performing the optimization, the server 108 generates an HTTP response including the data, and the server 108 transmits the HTTP response to the networking device 104 via the internet 106 at Step S210.

In a case when the HTTP request includes data generated by client-side scripting from a web application executed in a client-side browser of the electronic device 102, the server 108 may execute corresponding server-side scripting of the web application to process the received data and generate and/or retrieve data in response to the received data, and perform optimization of the data generated and/or retrieved by the server-side scripting. After performing the optimization, the server 108 generates an HTTP response including the data, and the server 108 transmits the HTTP response to the networking device 104 via the internet 106 at Step S210.

Alternatively, in a case when the HTTP request includes data from the web application to the server 108 for storage, the server 108 may store the data without executing server-side scripting.

At Step S212, the networking device 104 receives the response from the server 108 via the internet 106, and the networking device 104 performs optimization of data included in the response as described below in detail with reference to FIG. 5. After performing the optimization, the networking device 104 forwards the response to electronic device 102.

By performing the exemplary process flow illustrated in FIG. 2 between the electronic device 102, the networking device 104, and the server 108 of FIG. 1, the present disclosure provides an technique for dynamic optimization of data related to a web application, thereby allowing for exchanging of optimized data to reduce processing times for tasks performed by the web applications, decrease response time for transferring and receiving data from a server, and decrease usage of bandwidth for transfer of data. Accordingly, the present disclosure provides an improved user experience when interacting with a website using a web application optimized according to the present disclosure.

As described above, optimization is performed by the networking device 104 at Step S204, optimization is performed by the server 106 at Step S208, and optimization is performed by the networking device 104 at S212. However, it should be understood that the present disclosure is not limited to such a configuration. For example, the present disclosure contemplates that optimization does not have to be performed at all three of these steps, that is, optimization in accordance with aspects of the present disclosure may be performed at any one or any two of these steps. Further, it is contemplated that additional optimization not illustrated in FIG. 2 may be performed accordance with aspects of the present disclosure, as necessary, to realize the above-described technique for dynamic optimization of data related to a web application.

The inventors of the present disclosure have achieved significant reduction in size of components used in web applications by performing optimization of data in accordance with the aspects of the present disclosure described herein. In particular, by performing optimization of data in accordance with the aspects of the present disclosure described herein, the inventors have achieved the following sample results: when data to be optimized is an image file, an approximate improvement of 69.11% was realized (a size of 5792.99 KB before optimization and 1789.55 KB after optimization); when data to be optimized is a JavaScript file, an approximate improvement of 32.93% was realized (a size of 1237.52 KB before optimization and 830 KB after optimization); when data to be optimized is a CSS file, an approximate improvement of 13.94% was realized (a size of 162.8 KB before optimization and 140.1 KB after optimization); and when data to be optimized is an HTML file, an approximate improvement of 9.85% was realized (a size of 822 KB before optimization 741 KB after optimization).

Figure 3:
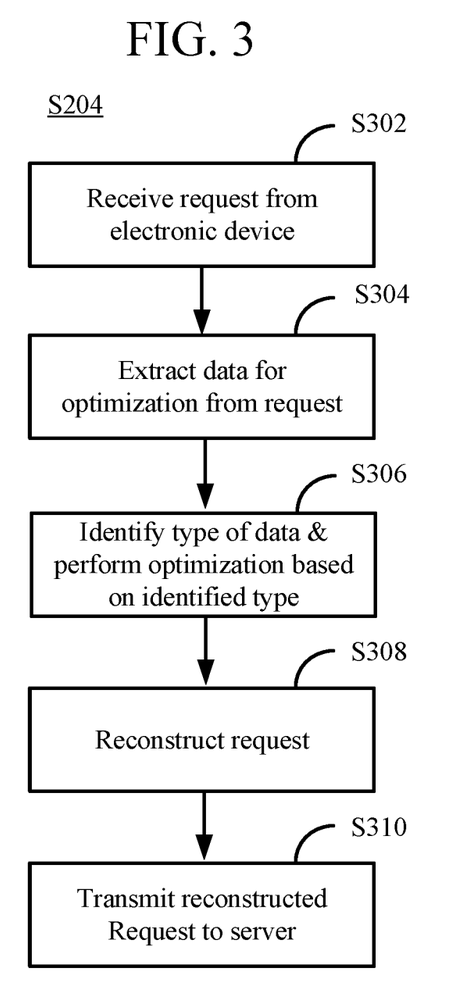
FIG. 3 illustrates an exemplary method for dynamic optimization of web applications in accordance with an aspect of the present disclosure.

FIG. 3 illustrates an exemplary method for dynamic optimization of web applications in accordance with an aspect of the present disclosure. More specifically, FIG. 3 illustrates an exemplary processing performed by the networking device 104 at step S204 of FIG. 2.

At Step S302, the networking device 104 receives the request sent by electronic device 102 at Step S202 of FIG. 2, and at Step S304, the networking device 104 extracts data for optimization from the request.

At Step S306, the networking device 104 performs optimization of the extracted data. More specifically, the networking device 104 identifies a type of the extracted data and performs optimization on the extracted data based on the identified type.

For example, in a case when the networking device 104 identifies the type of extracted data as data related to a request for a resource hosted by the server 108, the networking device 104 may perform one or more optimization processes for reducing size of the extracted data including removing text line breaks, removing tab spaces, replacing double spaces with single spaces, and any other known process for reducing a size of the extracted data.

In a case when the networking device 104 identifies the type of extracted data as analytics data collected by client-side scripting executed by a client-side web browser, the networking device 104 may perform one or more optimization processes on the analytics data including data compression of the analytics data if the analytics data is not compressed, decoding and re-encoding of the analytics data if a more efficient data compression technique is available, decoding and re-encoding of the analytics data if it is possible to compress the analytics data to a greater degree, and any other known process to reduce a size of the analytics data.

In a case when the networking device 104 identifies the type of the extracted data to be a resource for enabling efficient data exchange between a client-script running on the electronic device 102 and the server 108, such as an XML file or a JSON file, the networking device 104 may perform one or more optimization processes on the resource including removing unwanted tags, removing text line breaks, removing tab spaces, replacing double spaces with single spaces, removing comments, and any other known process for reducing a size of the resource.

At Step S308, the networking device 104 reconstructs the request to include the optimized data, and at Step S310, the networking device 104 forwards the request to the server 108 via the internet 106.

Figure 4:
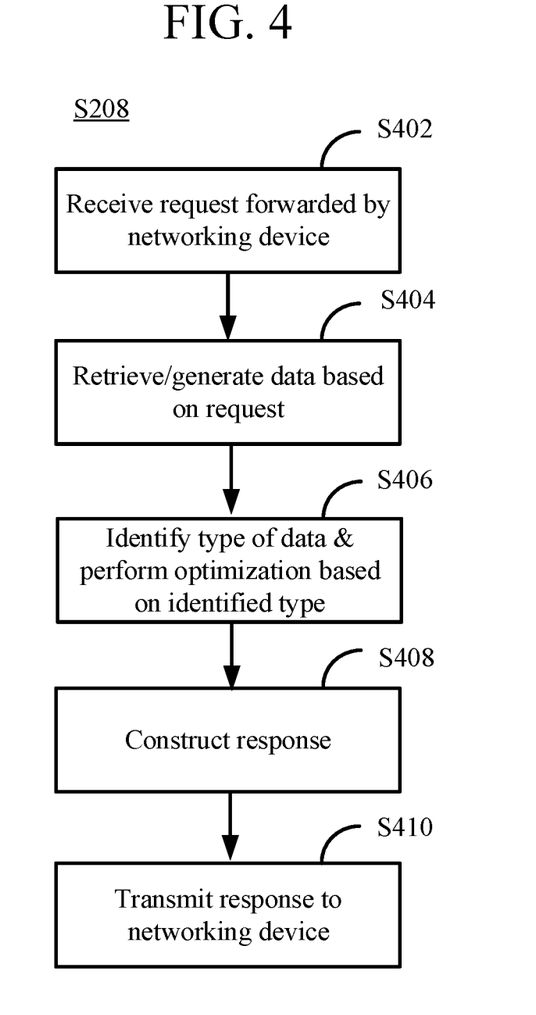
FIG. 4 illustrates an exemplary method for dynamic optimization of web applications in accordance with an aspect of the present disclosure.

FIG. 4 illustrates an exemplary method for dynamic optimization of web applications in accordance with an aspect of the present disclosure. More specifically, FIG. 4 illustrates an exemplary processing performed by the server 108 at step S208 of FIG. 2.

At Step S402, the server 108 receives the request forwarded by network device 102 via the internet 106 at Step S206 of FIG. 2, and at Step S404, the server 108 generates data and/or retrieves data from storage based on the received request. For example, in a case when the request is an HTTP request for requesting a resource hosted by the server 108, the server 108 accesses a storage based on the received request to retrieve the requested resource. Alternatively, if the HTTP request includes data generated by client-side scripting from a web application executed in a client-side browser of the electronic device 102, the server 108 performs an action in response to the data including executes corresponding server-side scripting of the web application to process the received data to generate data and/or retrieve data from storage. Additionally, the server 108 may perform an action to store the data included in the request into storage.

At Step S406, the server 108 performs optimization of the generated data and/or retrieved data. More specifically, the server 108 identifies a type of the generated data and/or retrieved data and performs optimization on the generated data and/or retrieved data based on the identified type.

For example, in a case when the server 108 identifies the type of the generated data and/or retrieved data as being executable code, such as client-side scripting to be executed in the client-side web browser of the electronic device 102, the server 108 may perform one or more optimization processes for improving the performance of the code including removing an operation that does not affect the results of the code, combining several operations with an equivalent operation, simplifying or reordering operations using algebraic laws, removing a redundant operation, and any other process for improving performance of the code.

The server 108 may also perform one or more optimization processes for reducing a size of the code without altering the behavior of the code including reducing a length of a variable, reducing a length of a function, removing text line breaks, removing tab spaces, replacing double spaces with single spaces, removing comments, and any other known process for reducing a size of the code without altering the behavior of the code.

Additionally, the server 108 may identify a programming language of the client-side scripting, and the server 108 perform program-language dependent optimization based on particulars of the syntax of the identified programming language.

In a case when the server identifies the type of the generated data and/or retrieved data to be data having an executable component for execution on the electronic device 102, the server 108 may perform one or more optimization processes on the executable component including removing unwanted bug data, removing unused data types included in the executable component, and any other known process to reduce a size of the executable component.

In a case when the server 108 identifies the type of the generated data and/or retrieved data to be a resource associated with a website currently displayed using the client-side web browser of the electronic device 102 such as an image file, a video file, a text file, a font, or other embeddable component for display of the website in the client-side browser of the electronic device 102, the server 108 may perform one or more optimization processes on the resource including data compression of the resource if the resource is not compressed, decoding and re-encoding of the resource if a more efficient data compression technique is available, decoding and re-encoding of the resource if it is possible to compress the resource to a greater degree, and any other known process to reduce a size of the resource.

In a case when the server 108 identifies the type of the generated data and/or retrieved data to be a resource for enabling efficient data exchange between a client-script running on the electronic device 102 and the server 108, such as an XML, file or a JSON file, the server 108 may perform one or more optimization processes on the resource including removing unwanted tags, removing text line breaks, removing tab spaces, replacing double spaces with single spaces, removing comments, and any other known process for reducing a size of the resource.

At Step S408, the server 108 constructs a response to the request forwarded by networking device 104 using the optimized data, and at Step S410, the server 108 transmits the response to the networking device 104 via the internet 106.

Figure 5:
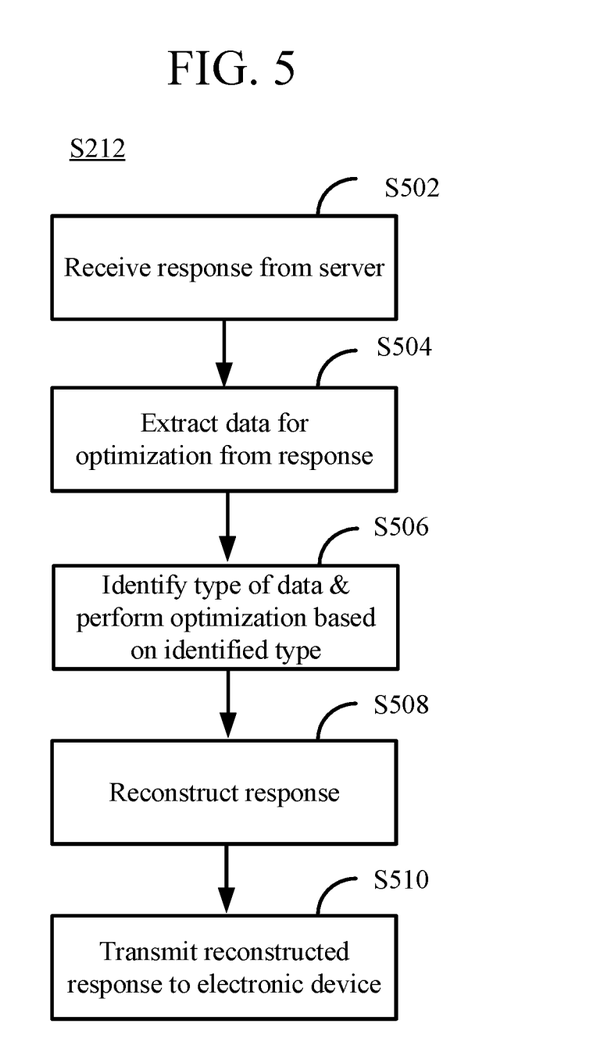
FIG. 5. illustrates an exemplary method for dynamic optimization of web supplication in accordance with an aspect of the present disclosure.

FIG. 5 illustrates an exemplary method for dynamic optimization of web supplication in accordance with an aspect of the present disclosure. More specifically, FIG. 4 illustrates an exemplary processing performed by the network device 102 at step S210 of FIG. 2.

At Step S502, the networking device 104 receives the response sent by server 108 via the internet 106 at Step S210 of FIG. 2, and at Step S504, the networking device 104 extracts data for optimization from the response.

At Step S506, the networking device 104 performs optimization of the extracted data. More specifically, the networking device identifies a type of the extracted data and performs optimization on the extracted data based on the identified type.

For example, in a case when the networking device 104 identifies the type of the extracted data as being executable code, such as client-side scripting to be executed in the client-side web browser of the electronic device 102, the networking device 104 may perform one or more optimization processes for improving the performance of the code including removing an operation that does not affect the results of the code, combining several operations with an equivalent operation, simplifying or reordering operations using algebraic laws, removing a redundant operation, and any other process for improving performance of the code.

The networking device 104 may also perform one or more optimization processes for reducing a size of the code without altering the behavior of the code including reducing a length of a variable, reducing a length of a function, removing text line breaks, removing tab spaces, replacing double spaces with single spaces, removing comments, and any other known process for reducing a size of the code without altering the behavior of the code.

Additionally, the networking device 104 may identify a programming language of the client-side scripting, and the networking device 104 perform program-language dependent optimization based on particulars of the syntax of the identified programming language.

In a case when the networking device 104 identifies the type of the extracted data to be data having an executable component for execution on the electronic device 102, the networking device 104 may perform one or more optimization processes on the executable component including removing unwanted bug data, removing unused data types included in the executable component, and any other known process to reduce a size of the executable component.

In a case when the networking device 104 identifies the type of the generated data and/or retrieved data to be a resource associated with a website currently displayed using the client-side web browser of the electronic device 102, such as an image file, a video file, a text file, a font, or other embeddable component for display of the web site in the client-side browser of the electronic device 102, the networking device 104 may perform one or more optimization processes on the resource including data compression of the resource if the resource is not compressed, decoding and re-encoding of the resource if a more efficient data compression technique is available, decoding and re-encoding of the resource if it is possible to compress the resource to a greater degree, and any other known process to reduce a size of the resource.

In a case when the networking device 104 identifies the type of the generated data and/or retrieved data to be a resource for enabling efficient data exchange between a client-script running on the electronic device 102 and the server 108, such as an XML, file or a JSON file, the networking device 104 may perform one or more optimization processes on the resource including removing unwanted tags, removing text line breaks, removing tab spaces, replacing double spaces with single spaces, removing comments, and any other known process for reducing a size of the resource.

At Step S508, the networking device 104 reconstructs the response to include the optimized data, and the networking device 104 forwards the response to the electronic device 102.

Figure 6:
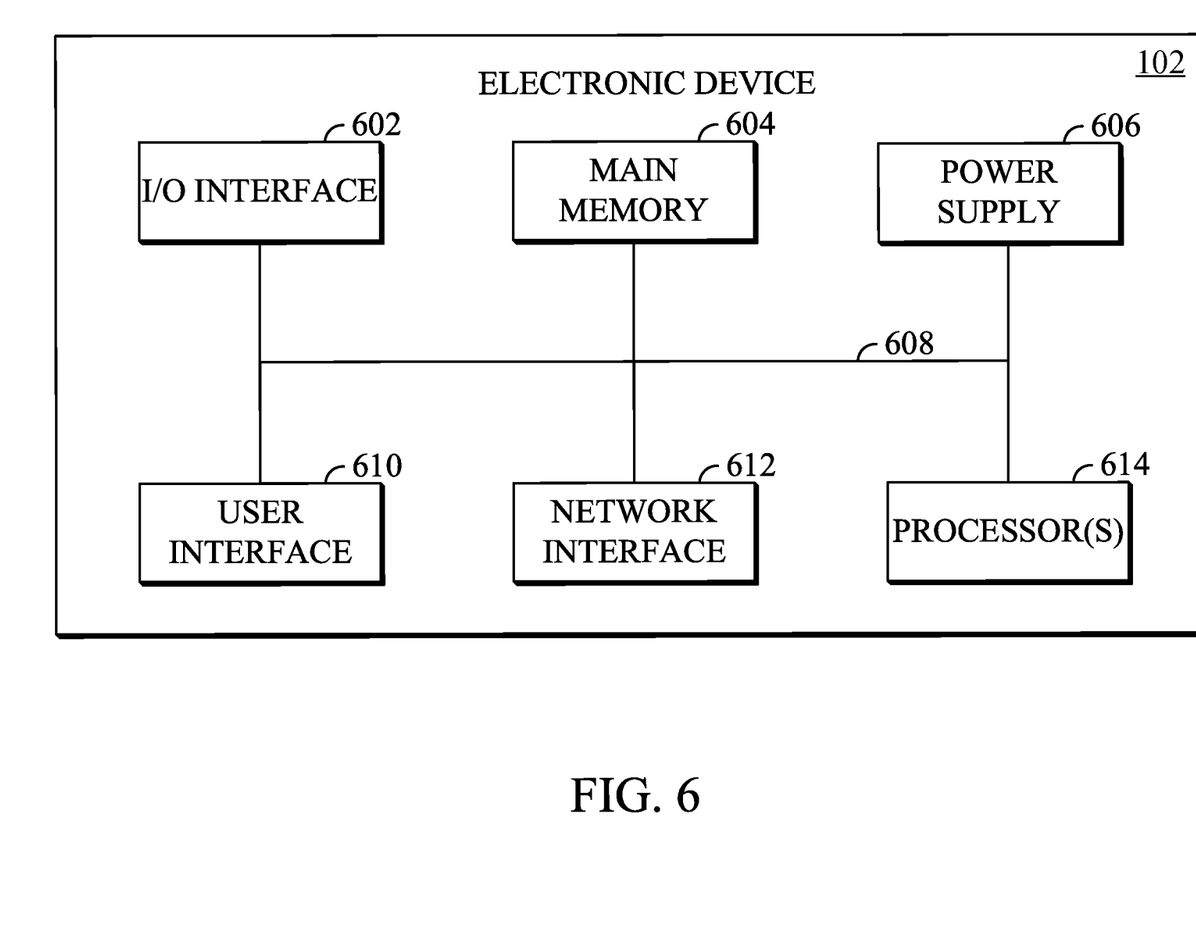
FIG. 6 illustrates a block diagram of an exemplary electronic device according to an aspect of the present disclosure.

FIG. 6 is a block diagram of an exemplary implementation of the electronic device 102 according to an aspect of the present disclosure. It is contemplated by the present disclosure that the electronic device 102 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As illustrated in FIG. 6, the exemplary electronic device 102 includes one or more memories or memory locations including a main memory 604 as well as an I/O interface 602, a user interface 610, a network interface 612, one or more processors 614, and an optional power supply 606. The main memory 604 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 604 can be used to store any type of instructions associated with algorithms, processes, or operations for controlling the general functions of the electronic device 106 including the operations of software as well as any operating system, such as Linux, UNIX, Windows Server, or other customized and proprietary operating systems.

The optional power supply 606 can be used to power the various components of the electronic device 102. The power supply 606 can be self-contained, such as a battery pack, and/or the power supply 606 can include an interface to be powered through an electrical outlet.

The I/O interface 602 can be an interface for enabling the transfer of information between the electronic device 102 and external devices connected to the electronic device 102 that need special communication links for interfacing with the one or more processors 614. The I/O interface 602 can be implemented to accommodate various connections to the electronic device 106 that include, but is not limited to, a universal serial bus (USB) connection, parallel connection, a serial connection, coaxial connection, a High-Definition Multimedia Interface (HDMI) connection, or other known connection in the art connecting to external devices.

The user interface 610 is implemented for allowing communication between a user and the electronic device 102. The user interface 610 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 612 is a software and/or hardware interface implemented to establish a connection between the electronic device 102 and the networking device 104 according to one or more aspects of the present disclosure described above. It is contemplated by the present disclosure that the network interface 604 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 614 are used for controlling the general operations of the electronic device 102. Each one or the one or more processors 614 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the electronic device 102. Communication between the components of the electronic device 102 (e.g., 602, 604, 606, 610, 612, and 614) are established using an internal bus 608.

Figure 7:
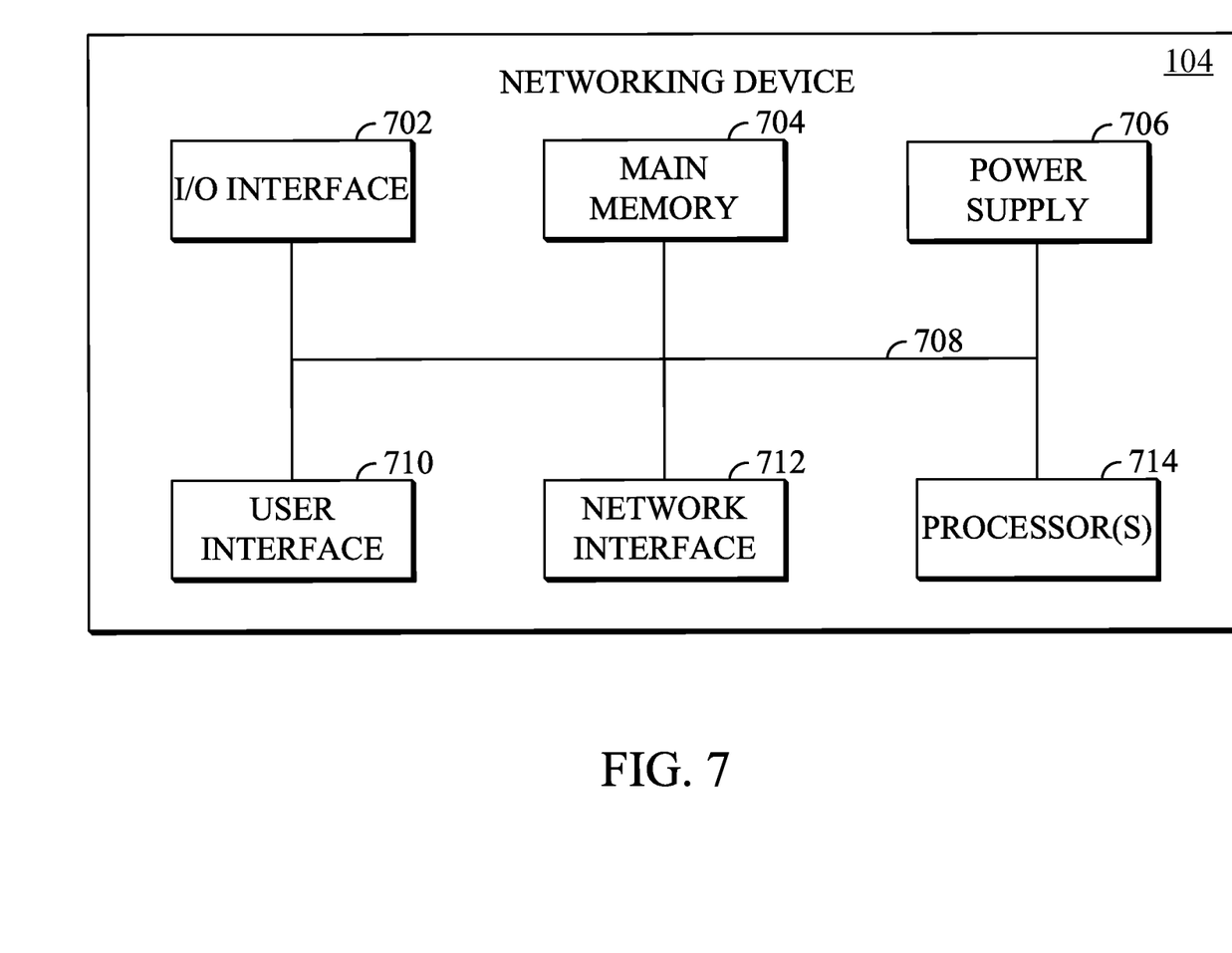
FIG. 7 illustrates a block diagram of an exemplary networking device according to an aspect of the present disclosure.

FIG. 7 is a block diagram of an exemplary implementation of the networking device 104 according to an aspect of the present disclosure. It is contemplated by the present disclosure that the networking device 104 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As illustrated in FIG. 7, the exemplary networking device 104 includes one or more memories or memory locations including a main memory 704 as well as an I/O interface 702, a user interface 710, a network interface 712, one or more processors 714, and an optional power supply 706. The main memory 704 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 704 can be used to store any type of instructions associated with algorithms, processes, or operations for controlling the general functions of the networking device 104 including the operations of software as well as any operating system, such as Linux, UNIX, Windows Server, or other customized and proprietary operating systems.

The optional power supply 706 can be used to power the various components of the networking device 104. The power supply 706 can be self-contained, such as a battery pack, and/or the power supply 706 can include an interface to be powered through an electrical outlet.

The I/O interface 702 can be an interface for enabling the transfer of information between the networking device 104 and external devices connected to the networking device 104 that need special communication links for interfacing with the one or more processors 714. The I/O interface 702 can be implemented to accommodate various connections to the networking device 104 that include, but is not limited to, a universal serial bus (USB) connection, parallel connection, a serial connection, coaxial connection, a High-Definition Multimedia Interface (HDMI) connection, or other known connection in the art connecting to external devices.

The user interface 710 is implemented for allowing communication between a user and the networking device 104. The user interface 710 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 712 is a software and/or hardware interface implemented to establish a connection between the networking device 104 and the external device 102 and/or a connection between the networking device 102 and the server 108 via the internet 106 according to one or more aspects of the present disclosure described above. It is contemplated by the present disclosure that the network interface 712 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 714 are used for controlling the general operations of the networking device 104. Each one or the one or more processors 714 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the networking device 104. Communication between the components of the networking device 104 (e.g., 702, 704, 706, 710, 712, and 714) are established using an internal bus 708.

Figure 8:
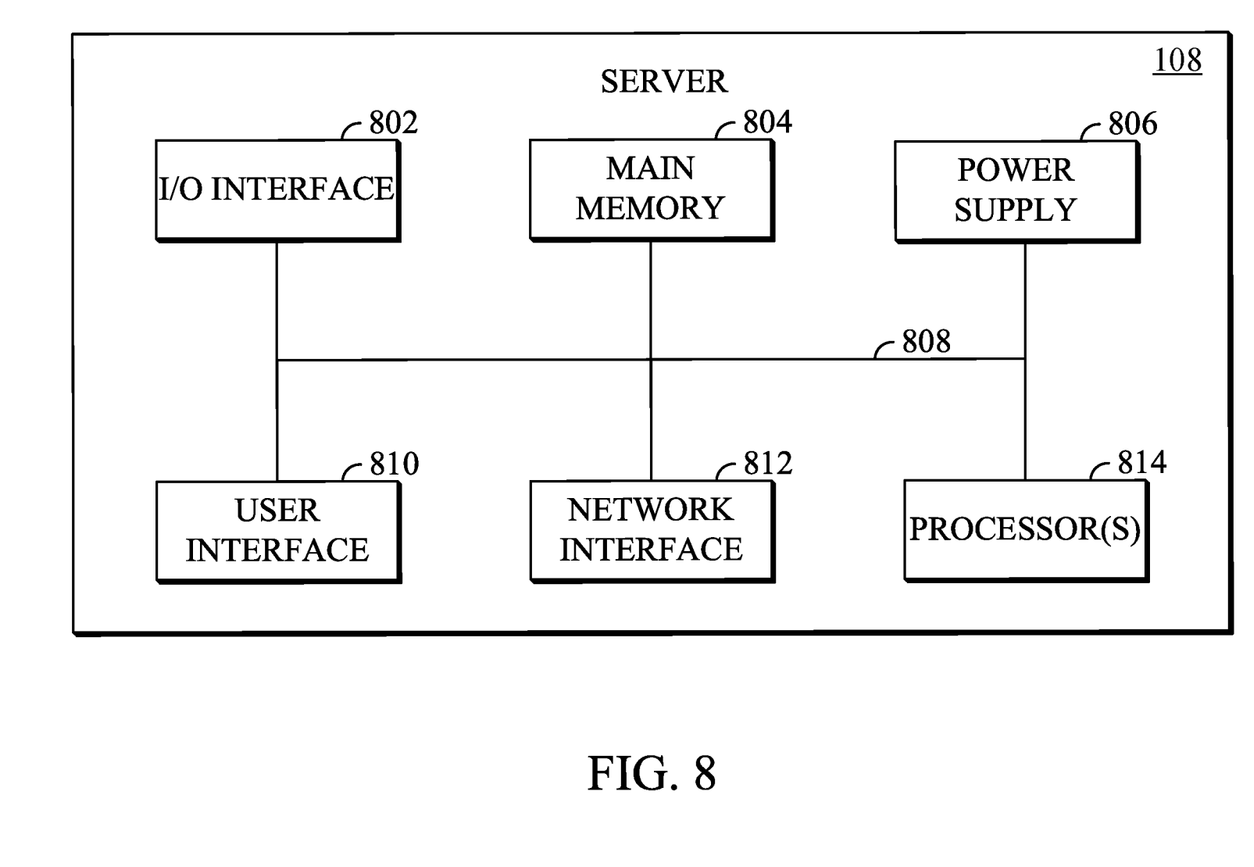
FIG. 8 illustrates a block diagram of an exemplary server according to an aspect of the present disclosure.

FIG. 8 is a block diagram of an exemplary implementation of server 106 according to an aspect of the present disclosure. It is contemplated by the present disclosure that the server 106 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As illustrated in FIG. 8, the exemplary server 108 includes one or more memories or memory locations including a main memory 804 as well as an I/O interface 802, a user interface 810, a network interface 812, one or more processors 814, and an optional power supply 806. The main memory 704 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 804 can be used to store any type of instructions associated with algorithms, processes, or operations for controlling the general functions of the server 108 including the operations of software as well as any operating system, such as Linux, UNIX, Windows Server, or other customized and proprietary operating systems.

The optional power supply 806 can be used to power the various components of the server 108. The power supply 806 can be self-contained, such as a battery pack, and/or the power supply 806 can include an interface to be powered through an electrical outlet.

The I/O interface 802 can be an interface for enabling the transfer of information between the server 108 and external devices connected to the server 108 that need special communication links for interfacing with the one or more processors 814. The I/O interface 802 can be implemented to accommodate various connections to the server 108 that include, but is not limited to, a universal serial bus (USB) connection, parallel connection, a serial connection, coaxial connection, a High-Definition Multimedia Interface (HDMI) connection, or other known connection in the art connecting to external devices.

The user interface 810 is implemented for allowing communication between a user and the server 108. The user interface 810 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 812 is a software and/or hardware interface implemented to establish a connection between the server 108 and the networking device 104 according to one or more aspects of the present disclosure described above. It is contemplated by the present disclosure that the network interface 804 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 814 are used for controlling the general operations of the server 108. Each one or the one or more processors 814 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the server 108. Communication between the components of the server 108 (e.g., 802, 804, 806, 810, 812, and 814) are established using an internal bus 808.

As described above by way of example, the present disclosure provides an technique for dynamic optimization of data related to a web application, thereby allowing for exchanging of optimized data to reduce processing times for tasks performed by the web applications, decrease response time for transferring and receiving data from a server, and decrease usage of bandwidth for transfer of data. Accordingly, the present disclosure provides an improved user experience when interacting with a website using a web application optimized according to the present disclosure.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components which perform a part or all of the functions of the secure conditional access architecture.

The present disclosure includes the use of computer programs or algorithms. The programs or algorithms can be stored on a non-transitory computer-readable medium for causing a computer, such as the one or more processors, to execute the steps described in FIGS. 2-5. For example, the one or more memories stores software or algorithms with executable instructions and the one or more processors can execute a set of instructions of the software or algorithms in association with executing generating, processing provisioning requests and provisioning messages, as described in FIGS. 2-5.

The computer programs, which can also be referred to as programs, software, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of systems, methods, and programs for performing the features of the secure conditional access architecture. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

The invention claimed is:

1. A method for optimization of data by a networking device, the method comprising:
   receiving, from a server, a data packet including data for use with an application executable in a web browser at an external device;
   extracting data from the data packet;
   identifying a type of the extracted data;
   performing optimization of the extracted data based on the identified type of the extracted data and generating optimized data based on the optimization so as to reduce processing time for a task performed by the application executable in the web browser;
   reconstructing the data packet to include the optimized data; and
   transmitting, to the external device, the reconstructed data packet.

2. The method according to claim 1,
   wherein the in the identifying, the extracted data is identified as executable code for executing the application executable in the web browser at the external device, and
   wherein in the performing optimization, the optimization is performed on the executable code to reduce a size of the executable code, wherein reducing the size of the executable code comprises any of reducing a length of a variable, reducing a length of a function, removing text line breaks, removing tab spaces, replacing double spaces with single spaces, removing comments, or any combination thereof.

3. The method according to claim 2,
wherein in the identifying, a programming language of the executable code is identified, and
wherein in the performing optimization, the optimization is performed on the executable code to reduce the size of the executable code based on the programming language of the executable code.

4. The method according to claim 1,
wherein the in the identifying, the extracted data is identified as executable code for executing the application executable in the web browser at the external device, and
wherein in the performing optimization, the optimization is performed on the executable code to increase performance of the executable code.

5. The method according to claim 4,
wherein in the identifying, a programming language of the executable code is identified, and
wherein in the performing optimization, the optimization is performed on the executable code to increase the performance of the executable code based on the programming language of the executable code.

6. The method according to claim 1,
wherein the in the identifying, the extracted data is identified as a resource for data exchange between the application executable in the web browser at the external device and an application executed at the server,
wherein in the performing optimization, the optimization is performed on the resource for data exchange to reduce a size of the resource for the data exchange.

7. The method according to claim 1,
wherein the in the identifying, the extracted data is identified as a resource for use with the application executable in the web browser at the external device at the external device
wherein in the performing optimization, the optimization is performed on the resource for data exchange to reduce a size of the resource.

8. A networking device for performing the method for optimization of data according to claim 1.

9. A method for optimization of data by a server, the method comprising:
receiving, from a networking device, a data packet including data related to an application executable in a web browser at the external device;
performing an action to obtain data based on the data related to an application executable in the web browser at the external device;
identifying a type of the obtained data;
performing optimization of the obtained data based on the identified type of the obtained data and generating optimized data based on the optimization so as to reduce processing time for a task performed by the application executable in the web browser;
constructing a data packet to include the optimized data; and
transmitting, to the networking device, the constructed data packet.

10. The method according to claim 9, wherein the action to obtain data is retrieving data from a storage based on the data related to the application executable in the web browser at the external device.

11. The method according to claim 9, wherein the action to obtain data is executing a server-side application and generating, using the server-side application, data based on the data related to the application executable in the web browser at the external device.

12. The method according to claim 9,
wherein the in the identifying, the obtained data is identified as executable code for executing the application executable in the web browser at the external device, and
wherein in the performing optimization, the optimization is performed on the executable code to reduce a size of the executable code, wherein reducing the size of the executable code comprises any of reducing a length of a variable, reducing a length of a function, removing text line breaks, removing tab spaces, replacing double spaces with single spaces, removing comments, or any combination thereof.

13. The method according to claim 12,
wherein in the identifying, a programming language of the executable code is identified, and
wherein in the performing optimization, the optimization is performed on the executable code to reduce the size of the executable code based on the programming language of the executable code.

14. The method according to claim 9, wherein
wherein the in the identifying, the obtained data is identified as executable code for executing the application executable in the web browser at the external device, and
wherein in the performing optimization, the optimization is performed on the executable code to increase performance of the executable code.

15. The method according to claim 14,
wherein in the identifying, a programming language of the executable code is identified, and
wherein in the performing optimization, the optimization is performed on the executable code to increase the performance of the executable code based on the programming language of the executable code.

16. The method according to claim 9,
wherein the in the identifying, the obtained data is identified as a resource for data exchange between the application executable in the web browser at the external device and an application executed at the server,
wherein in the performing optimization, the optimization is performed on the resource for data exchange to reduce a size of the resource for the data exchange.

17. The method according to claim 9,
wherein the in the identifying, the obtained data is identified as a resource for use with the application executable in the web browser at the external device at the external device
wherein in the performing optimization, the optimization is performed on the resource for data exchange to reduce a size of the resource.

18. A server for performing the method for optimization of data according to claim 9.

19. A method for optimization of data by a networking device, the method comprising:
receiving, from an electronic device, a data packet including data for use with an application executable in a web browser at the external device;
extracting data from the data packet;
identifying a type of the extracted data;
performing optimization of the extracted data based on the identified type of the extracted data and generating optimized data based on the optimization so as to reduce processing time for a task performed by the application executable in the web browser;

reconstructing the data packet to include the optimized data; and transmitting, to a server, the reconstructed data packet.

20. A networking device for performing the method for optimization of data according to claim 19.

\* \* \* \* \*